(12) United States Patent
Taenaka et al.

(10) Patent No.: US 6,416,900 B1
(45) Date of Patent: Jul. 9, 2002

(54) ELECTROCHEMICAL CELL WITH GRADED ELECTRODE LEADS

(75) Inventors: Robert K. Taenaka, Granada Hills; James M. Hill, Torrance; Barry G. Gage, La Crescenta; Michael A. Allison, Torrance, all of CA (US)

(73) Assignee: Hughes Electronics Corp., El Segundo, CA (US)

( * ) Notice: Subject to any disclaimer, the term of this patent is extended or adjusted under 35 U.S.C. 154(b) by 51 days.

(21) Appl. No.: 09/617,467

(22) Filed: Jul. 17, 2000

(51) Int. Cl.7 ................................................ H01M 2/30
(52) U.S. Cl. ...................................... 429/161; 429/178
(58) Field of Search .............................. 429/122, 178, 429/181, 223, 225, 161

(56) References Cited

U.S. PATENT DOCUMENTS

| | | | | |
|---|---|---|---|---|
| 3,640,775 A | * | 2/1972 | Fitchman et al. ............ 136/134 |
| 4,420,545 A | * | 12/1983 | Meyer et al. ................ 429/101 |
| 5,401,595 A | * | 3/1995 | Kagawa et al. .............. 429/152 |
| 5,707,761 A | * | 1/1998 | Hayashi et al. ............. 429/206 |
| 5,786,108 A | * | 7/1998 | Sprengel et al. ............ 429/178 |
| 5,987,337 A | * | 11/1999 | Takaya ........................ 455/572 |
| 6,071,638 A | * | 6/2000 | Fradin .......................... 429/94 |

* cited by examiner

Primary Examiner—Patrick Ryan
Assistant Examiner—M. Wills
(74) Attorney, Agent, or Firm—John R. Rafter; Terje Gudmestad

(57) ABSTRACT

An electrochemical cell has electrode leads of different lengths extending from the terminals to the respective plate sets of the cell. The electrode leads have a cross-sectional area which varies along the length of the electrode leads, such that the electrical resistances of the electrode leads are substantially the same. Typically, each electrode lead has a first region having a first cross-sectional area, and a second region having a second cross-sectional area. The relative lengths of the first region and the second region of the electrode leads are varied to achieve the substantially constant total resistance.

17 Claims, 4 Drawing Sheets

ELECTROCHEMICAL CELL WITH GRADED ELECTRODE LEADS

This invention relates to an electrochemical cell, and, more particularly, to the structure of the electrode leads of such a cell wherein the terminals are at the same end of the cell.

BACKGROUND OF THE INVENTION

Rechargeable electrochemical cells are electrochemical energy storage devices for storing and retaining an electrical charge and later delivering that charge as useful power. The energy storage cell may be recharged after it has delivered the useful power, leading to a succession of charging and discharging cycles. Familiar examples of the rechargeable energy storage cell are the lead-acid battery used in automobiles and the nickel-cadmium battery used in various portable electronic devices. Another type of electrochemical cell having a greater storage capacity for its weight is the nickel oxide/pressurized hydrogen energy storage cell, an important type of which is commonly called the nickel-hydrogen cell and is used in spacecraft applications.

The nickel-hydrogen battery includes a series of active plate sets which store an electrical charge electrochemically and later deliver that charge as a useful current. The active plate sets are packaged within a hermetic pressure vessel that contains the plate sets and the hydrogen gas that is an essential active component of the energy storage battery. Each plate set includes a positive electrode, a negative electrode, and a separator between the two electrodes, all soaked with an electrolyte. In a typical nickel-hydrogen cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen cell delivers current at about 1.3 volts, and a number of the cells are usually electrically interconnected in series as a battery to produce current at the voltage required by the systems of the spacecraft.

The nickel-hydrogen cell may be configured such that its positive terminal and its negative terminal are at opposite ends of the pressure vessel or at the same end of the pressure vessel. When the terminals are at the same end of the pressure vessel, it has been observed that the individual plate sets may wear out at different rates over the life of the cell. This uneven performance has been traced to the different electrical resistances of the electrode leads. That is, the electrode leads extending to the plate sets nearest to the terminals are shorter than the electrode leads extending to the plate sets furthest from the terminals. The electrical resistance of the electrode leads varies according to their length, leading to a greater electrical resistance for the longer leads than for the shorter leads, which in turn causes the uneven performance of the individual plate sets.

Two approaches have been proposed for overcoming this problem. In one, the electrode leads are made larger in cross section, so that their resistivity is smaller and there is consequently less variation in total resistance for the longer and the shorter electrode leads. This approach results in an undesirable increase in weight for the electrode leads. In a second approach, the shorter electrode leads are made of smaller-cross-section electrical conductor material than the longer electrode leads, resulting in a closer matching of the total resistance of the electrode leads. The second approach results in added complexity in manufacturing due to the necessity of stocking a number of different sizes of electrode leads, and also has not been found to be totally successful in overcoming the problem in practical applications.

There is a need for an improved approach to avoiding uneven performance in the plate sets of nickel-hydrogen and other types of electrochemical cells whose terminals are at one end of the cell. The present invention fulfills this need, and further provides related advantages.

SUMMARY OF THE INVENTION

The present invention provides an improved electrochemical cell whose electrode leads are graded to provide substantially constant electrical resistance regardless of the lengths of the electrode leads to the various plate sets. The performance of the various electrode lead/plate sets is thereby equalized. The approach is easily implemented in the manufacturing of the electrochemical cell, and does not require the stocking of a large variety of leads of different cross-sectional areas.

In accordance with the invention, an electrochemical cell such as a nickel-hydrogen cell comprises a terminal set, including a positive terminal and a negative terminal, and a cell including at least two plate sets. Each plate set includes a positive electrode, a negative electrode, and an electrolyte contained in a separator therebetween. There is an electrode lead set for each respective plate set. Each electrode lead set includes a metallic conductor lead comprising a positive metallic conductor lead extending between the positive terminal and the respective positive electrode, and a negative metallic conductor lead extending between the negative terminal and the respective negative electrode. The various positive metallic conductor leads are usually of different lengths for the various plate sets, and the various negative metallic conductor leads are usually of different lengths for the various plate sets. A cross-sectional area of the metallic conductor lead varies along a length of the metallic conductor lead. Preferably, the cross-sectional areas of the metallic conductors are selected such that the electrical resistance of each metallic conductor lead is substantially a constant value.

In one embodiment, the cross-sectional areas of the positive metallic conductors are selected such that the electrical resistance of each positive metallic conductor lead is substantially a constant value. The cross-sectional areas of the negative metallic conductors are selected such that the electrical resistance of each negative metallic conductor lead is substantially a constant value.

The cross-sectional areas are preferably graded according to regions along the length of the electrode leads. There may be a first region having a first cross-sectional area, and a second region having a second cross-sectional area, with optionally a transition region between the first region and the second region. The region of smaller cross-sectional area has a relatively higher resistivity per unit length, while the region of larger cross-sectional area has a relatively lower resistivity per unit length. By selecting the relative cross sectional areas and the relative lengths of each region, the overall electrical resistance of the electrode lead may be precisely established. In the approach of greatest interest to the inventors, a single first region area and a single second region area are used for each of the electrode leads. All of the leads for an electrochemical cell may be cut, as by punching, from a single basic flat stock material whose as-supplied cross-sectional area is the first-region cross-sectional area. The second region is formed by cutting or punching a selected length to a uniformly narrowed second region cross-sectional area. This minimizes stocking requirements and the potential for error in manufacturing operations.

The present approach permits the electrical resistances of the leads to the various plate sets to be precisely established. The result is that the plate sets wear out at a more uniform rate, without the variations in lead resistance found in conventional approaches. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 4A–4C are depictions of an electrode lead according to the invention, wherein FIG. 4A is a plan view, FIG. 4B is a schematic sectional view along line 4B–4B of FIG. 4A, and FIG. 4C is a schematic sectional view along line 4C–4C of FIG. 4A;

DETAILED DESCRIPTION OF THE INVENTION

Figure 1:
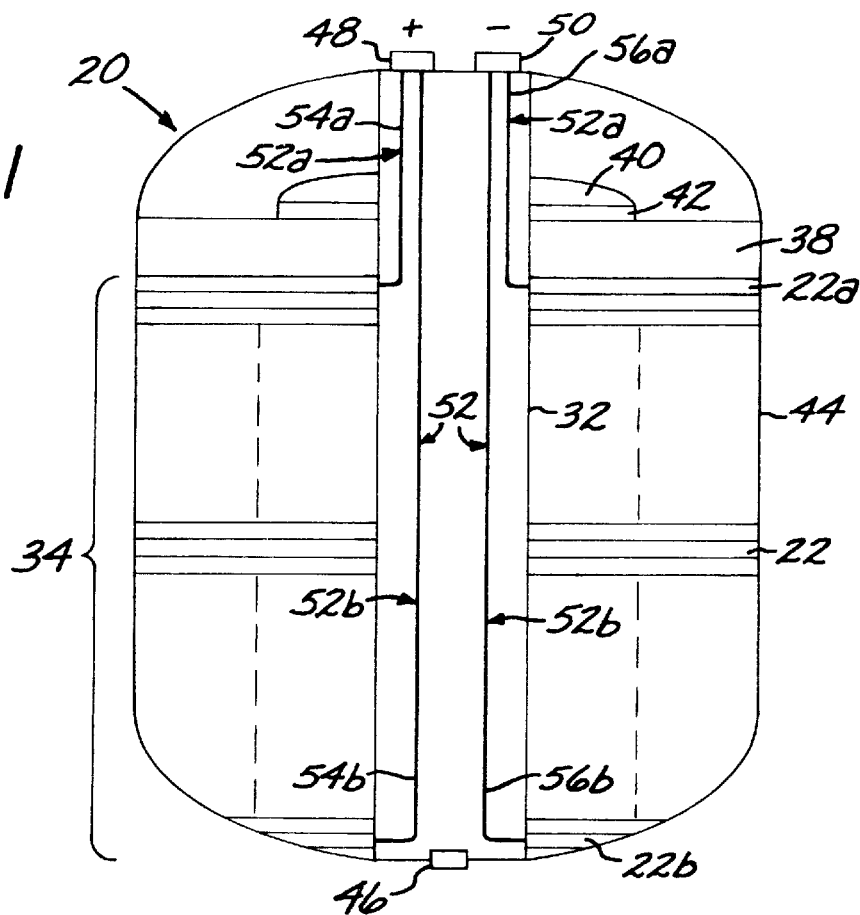
FIG. 1 is a schematic drawing of an electrochemical cell.

The present invention relates to an electrochemical cell, such as a nickelhydrogen cell 20 of the pressurized gas-metal type illustrated in FIG. 1. The basic features of nickel-hydrogen batteries and components, other than the improvements discussed herein, are well known and are disclosed, for example, in the following U.S. Pat. Nos. 4,683,178; 4,369,212; 4,283,844; 4,262,061; 4,250,235; 4,000,350; and 3,669,744.

Figure 2:
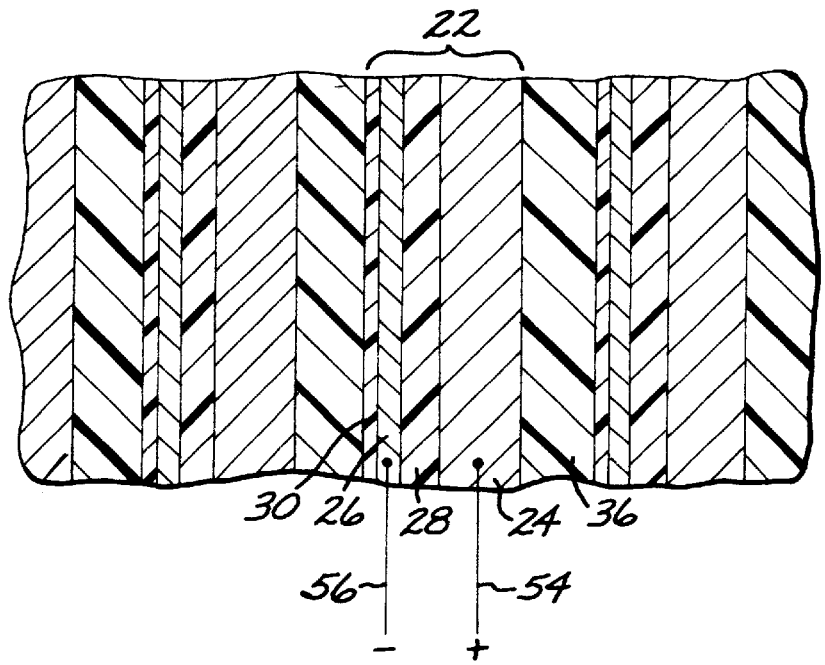
FIG. 2 is a schematic drawing of a single cell and its electrode leads.

The cell 20 comprises at least two, and typically a plurality of individual plate sets 22. As shown in FIG. 2, each plate set 22 in turn comprises an anode or positive electrode 24, a cathode or negative electrode 26, and an electrolyte-containing separator 28, which physically separates the electrodes 24 and 26 and also supplies the electrolyte medium through which ionic and electron charge transfer occurs.

In one construction presented as an example, the positive electrode 24 is formed by impregnating nickel hydroxide into porous sintered nickel that is supported on an etched nickel electrode substrate. The negative electrode 26 is coated on one side by a sintered mixture of platinum black and polytetrafluoroethylene and on the other side with a porous layer 30 of polytetrafluoroethylene. These layers are applied to a nickel substrate in the form of etched sheet or a woven mesh, to form the negative electrode 26. Many different types of separators 28 have been used, including, for example, asbestos, nylon, and a cloth of zirconium oxide-yttrium oxide. The electrolyte, preferably a 26 or 31 percent by weight concentration of aqueous potassium hydroxide, is impregnated into the separator 28.

The individual plate sets 22 are assembled onto a central core 32 to form a stacked array 34. A monofilament polypropylene screen 36 is placed between each plate set 22 during assembly, so that oxygen liberated during overcharging at each positive electrode 24 can diffuse away from the positive electrode 24 and to the negative electrode 26 to combine with hydrogen. The stacked array 34 is placed under a longitudinal pressure of, for example, about 10 pounds per square inch, by tightening a compression plate 38 against an end of the stacked array 34. The tightening of the compression plate 38 is preferably accomplished by compressing the array 34 and then tightening a nut 40 on threads on the core 32, thereby compressing a Belleville washer set 42 against the compression plate 38 to hold the stacked array 34 in place under compression.

The stacked array 34 is contained within a hermetically sealed pressure vessel 44 having a wall manufactured of a material such as Inconel 718 nickelbase alloy which can withstand internal pressures on the order of 1,000 psia (pounds per square inch absolute), without damage by hydrogen embrittlement. The material of construction of the pressure vessel 44 has a relatively low diffusion coefficient of hydrogen therethrough, so that hydrogen is contained within the interior of the pressure vessel 44. A gas fill tube 46 allows gas content and pressure within the pressure vessel 44 to be established initially, and the tube 46 is sealed after the initial charging procedures.

The pressure vessel 44 is typically constructed in the form of a cylindrical tube having domed (as illustrated) or squared ends. By way of illustration, the nickel-hydrogen energy storage cell 20 having the pressure vessel 44 of external dimensions of 3½ to 5½ inches in diameter by 13–15 inches long contains about 40–100 individual plate sets 22, with a resulting electrical storage capacity of the cell of about 50 to about 400 ampere-hours. The energy storage cell 20 may be charged and discharged through thousands of cycles without apparent damage, if the charging and discharging are accomplished properly. A number of energy storage cells 20 are ordinarily combined in series or parallel arrangements as a battery to provide the required voltage and current for the application.

The cell 20 is provided with an external positive terminal 48 and an external negative terminal 50. Electrical connection is made between the terminals 48 and 50 and each of the plate sets 22 by an electrode lead set 52. Only two electrode lead sets 52a and 52b are illustrated for clarity, but there is an electrode lead set 52 for each of the plate sets 22. That is, the lead sets 52a and 52b are in electrical parallel relationship between the terminals and the plate sets. Each of the electrode lead sets 52 is a metallic conductor such as a flat strip of Nickel 270 alloy shaped in the manner discussed subsequently. Each electrode lead set 52 includes a positive electrode lead 54 extending between the positive terminal 48 and the respective positive electrode 24, and a negative electrode lead 56 extending between the negative terminal 50 and the respective negative electrode 26. In FIG. 1, only the two positive leads 54a and 54b and the two negative electrode leads 56a and 56b are illustrated, but there is a positive lead 54 and a negative electrode lead 56 in each of the lead sets 52 extending to each of the plate sets 22.

Figure 3:
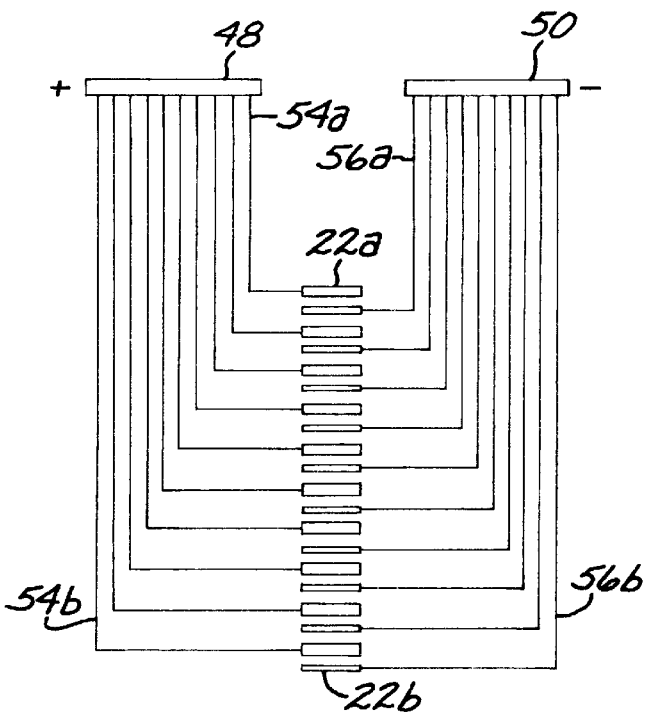
FIG. 3 is a schematic depiction of the relation of the plate sets and the terminals of the electrochemical cell of FIG. 1.

As is apparent from FIG. 1, the lead sets 52 are of different lengths. The lead set 52a, extending between the terminals 48, 50 and the nearest plate set 22a is much shorter than the lead set 52b extending between the terminals 48, 50 and the furthest plate set 22b. If the electrode leads 54 and 56 were of constant cross-sectional area, the electrical resistance of the electrode leads 54a, 56a, would be much less than the electrical resistance of the electrode leads 54b, 56b, leading to different performance of lead set 52a/plate set 22a and the lead set 52b/plate set 22b. As shown in FIG. 3, the lead sets 52a and 52b are associated with the smallest and largest resistances, but there is a wide range of intermediate values of resistance as well.

Desirably, the electrical resistance of each of the lead sets 52, including the extremes 52a and 52b and all of the intermediate lead sets as well, would be established at a selectable value, most preferably a constant and uniform value. The selected approach must be consistent with manufacturing practices. The present invention provides such an approach.

Figure 4A:
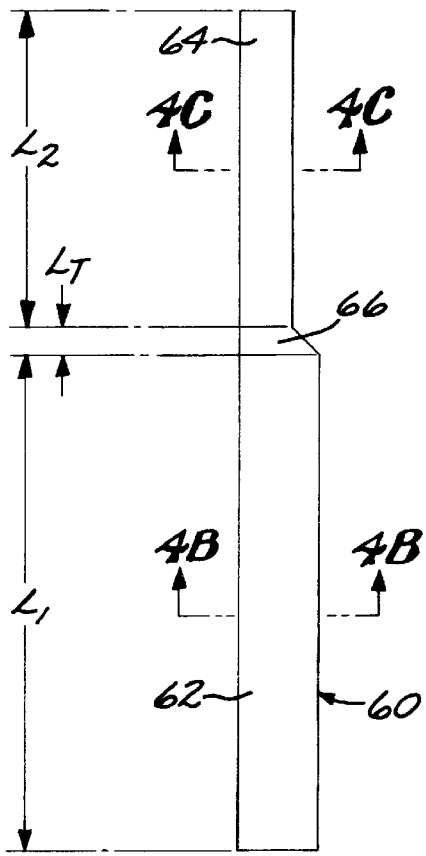
Figure 4B:
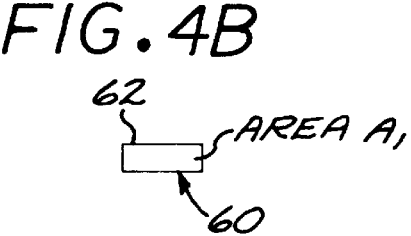
Figure 4C:
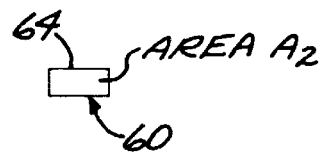

FIGS. 4A–4C illustrate an electrode lead 60 according to the invention, which may be used as any one of the leads such as the leads 52, 52a, and 52b. The electrode lead 60 is formed of a metal such as Nickel 270. It is preferably in the shape of a flat strip of varying width, as seen in FIGS. 4A–4C. The electrode lead 60 includes a first region 62 of length $L_1$ and having a first cross-sectional area $A_1$, and a second region 64 of length $L_2$ and having a second positive cross-sectional area $A_2$. There may be a step change between the first region 62 and the second region 64. More preferably, there is a gradual transition region 66 of length $L_T$ between the first region 62 and the second region 64. The electrode lead 60 may be either a positive electrode lead 54 or a negative electrode lead 56.

The electrical resistance of the electrode lead 60 is calculated as the series sum of the resistance of each region 62, 64, and 66. The electrical resistance of a region is generally determined as $\rho L/A$, where $\rho$ is the electrical resistivity of the metal, L is the length of the region, and A is the cross sectional area of the region. The electrical resistance of a region is inversely proportional to its area. For the transition region 66, the resistivity is a straightforward integral of this form.

In a manufacturing operation, the electrical resistance of the electrode lead is readily established. The strip material is furnished. The first region 62 has the area of the as-furnished strip material. A target resistance for each of the electrode lead sets 52 is selected. Each lead 60 is thereafter punched along a portion of its length to the smaller width and area associated with the second region 64, as determined by the calculation discussed in the preceding paragraph. The punching is accomplished using a precision punch press. Only one size of strip material need be stocked, and it may be punched to shape at the time of assembly using a punch press adjusted to produce exactly the correct width and length required.

Figure 5:
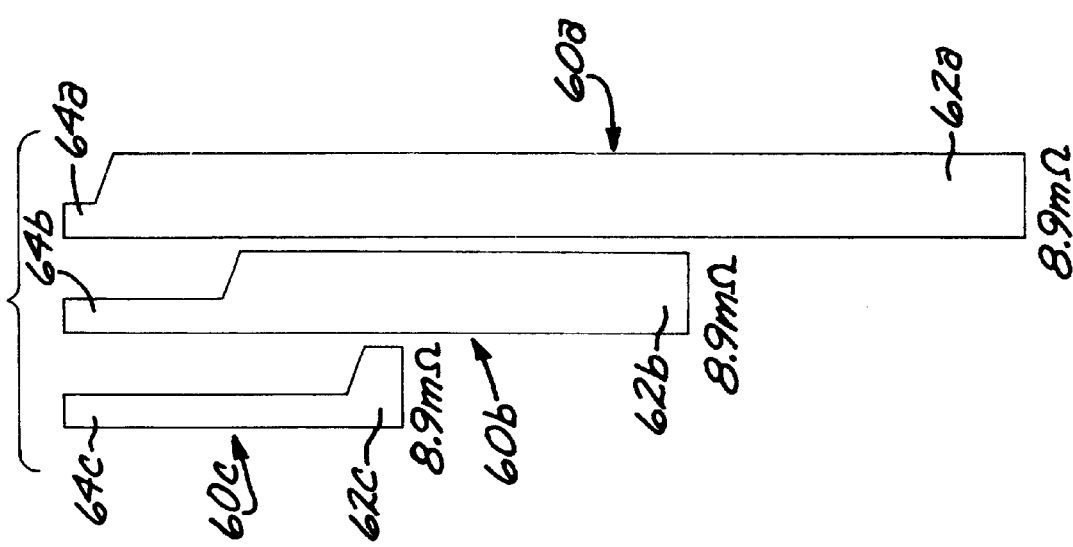
FIG. 5 is a depiction of three electrode leads produced according to a preferred approach.

FIG. 5 illustrates this approach for the case of a long electrode lead 60a, an intermediate-length electrode lead 60b, and a short electrode lead 60c. The short electrode lead 60c has a long second region 64c and a shorter first region 62c. The long electrode lead 60a has a short second region 64a and a longer first region 62a. The lengths of regions 64b and 62b are intermediate. By selection of the lengths of the second regions, the net result is that the electrical resistance of the electrode leads 60a, 60b, and 60c is substantially the same and equal to a selected constant value. In the example of FIG. 5 for three electrode leads in a preferred application, all three electrode leads 60a, 60b, and 60c have a selected resistance of 8.9 m$\Omega$. Alternatively, the electrical resistance of the electrode leads could be made different in some controllable fashion, but in most instances it is desired that they be the same for all of the plate sets 22.

Figure 6:
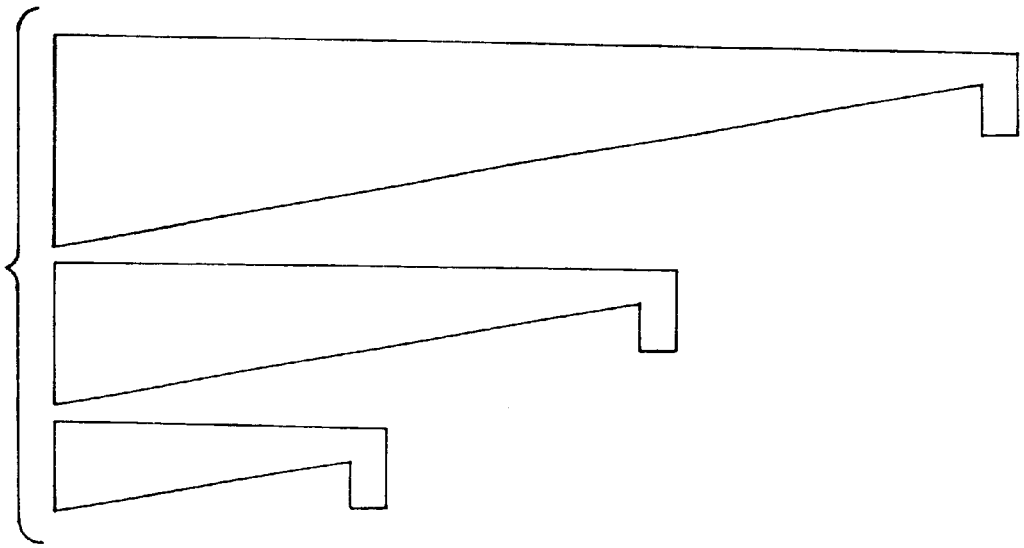
FIG. 6 is a depiction of three electrode leads produced according to another approach within the scope of the invention.

Another approach within the scope of the invention is illustrated in FIG. 6. Here, the area of the electrode lead varies continuously along its length. This approach is not favored, because it is more difficult to implement in practice. In an example, the resistances of the electrode leads vary somewhat from the short to the long electrode lead, for a situation where the widths of the leads are constrained to fit through apertures of specific sizes in the end of the pressure vessel.

Figure 8:
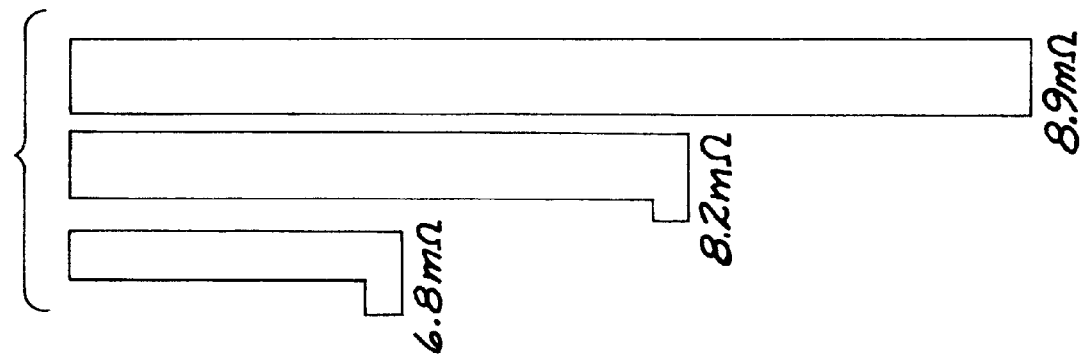
FIG. 8 is a depiction of three leads according to an alternative approach not within the scope of the invention.
Figure 7:
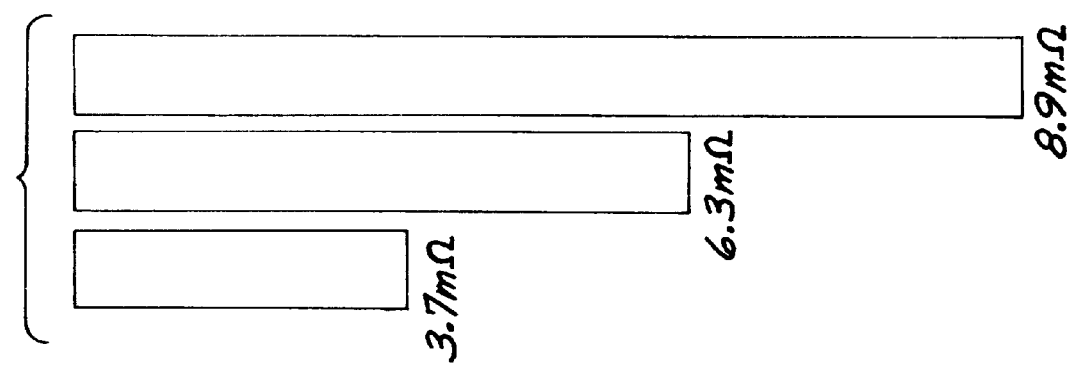
FIG. 7 is a depiction of three leads of the same uniform cross-sectional area, an approach not within the scope of the invention.

FIGS. 7 and 8 illustrate two electrode lead designs that are not within the scope of the invention. In the approach of FIG. 7, the electrode leads are uniformly of the same cross-sectional area along their lengths and the same for each electrode lead. In the approach of FIG. 8, the electrode leads are each uniform in cross-sectional area along their lengths but each of a different cross-sectional area. The variations in electrical resistance of the leads for the example are indicated.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electrochemical cell, comprising:
    a terminal set including a positive terminal and a negative terminal;
    a cell including at least two plate sets, each plate set including a positive electrode, a negative electrode, and an electrolyte therebetween; and
    an electrode lead set for each respective plate set, each electrode lead set including a metallic conductor lead comprising
        a positive metallic conductor lead extending between the positive terminal and the respective positive electrode, and
        a negative metallic conductor lead extending between the negative terminal and the respective negative electrode, wherein each metallic conductor lead includes
        a first region having a respective first length and a respective first cross-sectional area, and
        a second region having a respective second length and a respective second cross-sectional area different from the first cross-sectional area, and
    wherein the respective positive metallic conductor leads for each respective plate set are of different lengths and the respective negative metallic conductor leads for each respective plate set are of different lengths.

2. The electrochemical cell of claim 1, wherein the cross-sectional areas of the metallic conductors are selected such that the electrical resistance of each metallic conductor lead is substantially a constant value.

3. The electrochemical cell of claim 1, wherein the cross-sectional areas of the positive metallic conductors are selected such that the electrical resistance of each positive metallic conductor lead is substantially a constant value.

4. The electrochemical cell of claim 1, wherein the cross-sectional areas of the negative metallic conductors are selected such that the electrical resistance of each negative metallic conductor lead is substantially a constant value.

5. The electrochemical cell of claim 1, wherein the electrochemical cell is a nickel-hydrogen cell.

6. An electrochemical cell, comprising:

a terminal set, including a positive terminal and a negative terminal;

a cell including at least two plate sets, each plate set including a positive electrode, a negative electrode, and an electrolyte therebetween; and an electrode lead set for each respective plate set, each electrode lead set including a metallic conductor lead whose length is different for each respective plate set, each metallic conductor lead comprising a positive metallic conductor lead extending between the positive terminal and the respective positive electrode, wherein a positive cross-sectional area of the positive metallic conductor lead varies along a length of the positive metallic conductor lead such that an electrical resistance of each positive metallic conductor lead is substantially the same, and a negative metallic conductor lead extending between the negative terminal and the respective negative electrode, wherein a negative cross-sectional area of the negative metallic conductor lead varies along a length of the negative metallic conductor lead such that an electrical resistance of each negative metallic conductor lead is substantially the same.

7. The electrochemical cell of claim 6, wherein each positive metallic conductor lead includes a first positive region having a first positive cross-sectional area, a second positive region having a second positive cross-sectional area, and a positive transition region between the first positive region and the second positive region.

8. The electrochemical cell of claim 6, wherein each negative metallic conductor lead includes a first negative region having a first negative cross-sectional area, a second negative region having a second negative cross-sectional area, and a negative transition region between the first negative region and the second negative region.

9. The electrochemical cell of claim 6, wherein the electrochemical cell is a nickel-hydrogen cell.

10. An electrochemical cell, comprising:

a terminal set, including a positive terminal and a negative terminal;

a cell including at least two plate sets, each plate set including a positive electrode, a negative electrode, and an electrolyte therebetween; and an electrode lead set for each respective plate set, each electrode lead set including a metallic conductor lead whose length is different for each respective plate set, each metallic conductor lead comprising a positive metallic conductor lead extending between the positive terminal and the respective positive electrode, wherein each positive metallic conductor lead includes a first positive region having a first positive cross-sectional area, and a second positive region having a second positive cross-sectional area, and wherein an electrical resistance of each of the positive metallic conductor leads is substantially the same, and a negative metallic conductor lead extending between the negative terminal and the respective negative electrode, wherein each negative metallic conductor lead includes a first negative region having a first negative cross-sectional area, and a second negative region having a second negative cross-sectional area, and wherein an electrical resistance of each of the negative metallic conductor leads is substantially the same.

11. The electrochemical cell of claim 10, wherein the electrochemical cell is a nickel-hydrogen cell.

12. The electrochemical cell of claim 1, wherein each metallic conductor lead is a flat strip.

13. The electrochemical cell of claim 6, wherein each metallic conductor lead is a flat strip.

14. The electrochemical cell of claim 10, wherein each metallic conductor lead is a flat strip.

15. The electrochemical cell of claim 1, wherein the first cross-sectional area of each respective metallic conductor lead is constant along the first length of the metallic conductor lead, and wherein the second cross-sectional area of each respective metallic conductor lead is constant along the second length of the metallic conductor lead.

16. The electrochemical cell of claim 1, wherein each positive metallic conductor lead includes a first positive region having a first positive cross-sectional area, a second positive region having a second positive cross-sectional area, and a positive gradual transition region between the first positive region and the second positive region, and wherein each negative metallic conductor lead includes a first negative region having a first negative cross-sectional area, a second negative region having a second negative cross-sectional area, and a negative gradual transition region between the first negative region and the second negative region.

17. The electrochemical cell of claim 1, wherein each positive metallic conductor lead includes a first positive region having a first positive cross-sectional area, a second positive region having a second positive cross-sectional area, and a positive step transition region between the first positive region and the second positive region, and wherein each negative metallic conductor lead includes a first negative region having a first negative cross-sectional area, a second negative region having a second negative cross-sectional area, and a negative step transition region between the first negative region and the second negative region.

* * * * *